United States Patent

[11] 3,566,211

[72] Inventor Per Svedberg
Vallingby, Sweden
[21] Appl. No. 677,334
[22] Filed Oct. 23, 1967
[45] Patented Feb. 23, 1971
[73] Assignee Allmanna Svenska Elektriska Aktiebolaget
Vasteras, Sweden
[32] Priority Oct. 25, 1966
[33] Sweden
[31] 14,606/1966

[54] THYRISTOR TYPE SEMI-CONDUCTOR DEVICE WITH AUXILIARY STARTING ELECTRODES
1 Claim, 8 Drawing Figs.

[52] U.S. Cl. ........ 317/235, 317/234
[51] Int. Cl. ........ H01l 9/00, H01l 11/00, H01l 13/00
[50] Field of Search ........ 317/235, 41, 41.1; 317/235, 41, 41.1

[56] References Cited
UNITED STATES PATENTS

| | | | |
|---|---|---|---|
| 3,275,906 | 9/1966 | Matsukura et al. | 317/234 |
| 3,356,862 | 12/1967 | Diebold et al. | 307/88.5 |
| 3,409,811 | 11/1968 | Gerlach | 317/235 |

*Primary Examiner*—John W. Huckert
*Assistant Examiner*—B. Estrin
*Attorney*—Jennings Bailey, Jr.

ABSTRACT: A thyristor is constituted by a body having at least four alternately P conducting and N conducting layers with two main electrodes for the load current; one of the layers has a connection for ignition current; one part of the body has a blocking voltage lower than that of the other parts; an auxiliary contact applied on such part is connected to the ignition current connection so that, when the blocking voltage of such part is exceeded, current is supplied to the ignition current connection.

INVENTOR.
PER SVEDBERG
BY
Jennings Bailey, Jr.

INVENTOR.
PER SVEDBERG
BY
Jennings Bailey Jr

INVENTOR.
PER SVEDBERG
BY
Jennings Bailey Jr

THYRISTOR TYPE SEMI-CONDUCTOR DEVICE WITH AUXILIARY STARTING ELECTRODES

BACKGROUND OF THE INVENTION

1. Field of the Invention

The present invention relates to a semiconductor device comprising a body of semiconductor material in which at least four alternately P conducting and N conducting layers are formed and which is provided with at least two main electrodes for the load current, in which a defined part of the semiconductor body has a blocking voltage which is lower than the blocking voltage of the other parts and in which one of the layers is provided with a connection for supplying ignition current.

2. The Prior Art

A thyristor is such a device. It usually consists of a thin sheet of monocrystalline silicon in which doping substance has been introduced so that the sheet consists of four layers which are in turn P, N, P and N conducting. The first P conducting layer is provided with an anode connection and the last N conduction layer with a cathode connection. A control electrode is connected to one of the middle layers.

The thyristors can take up a certain maximum blocking voltage (the anode positive in relation to the cathode) without self-ignition taking place. Although recently it has been possible to increase the blocking voltages of such thyristors up to about 1 *k*V, in systems which are to operate within voltage ranges of from a few *k*V up to hundreds of *k*V, it is necessary to series-connect several thyristors This series-connection causes some problems, one of which is connected with the overloading which may arise upon the ignition of such a thyristor chain.

A thyristor is ignited, that is switched over from its blocking condition to its conducting condition, by supplying a suitable control signal to the control device of the thyristor or by giving the thyristor a rapid voltage increase, so-called $dV/dt$-signal, or by exceeding the maximum blocking voltage of the thyristor, the so-called breakover voltage. The two latter methods are really only different in degree. The breakover voltage can be defined as a function of the steepness of the $dV/dt$-signal and it may be said that the thyristor is ignited when the breakover voltage in this sense is exceeded. In future this type of ignition will be referred to as self-ignition. The first type of ignition is called controlled ignition.

When the thyristor ignites, the ignition usually starts in a small area and then spreads sideways until the whole thyristor area has become conducting. Immediately after the ignition, the current is led through a small part of the thyristor and the dissipation density may then become considerable.

This concentration of the losses at the moment of ignition may have catastrophic results, particularly when series-connected thyristors are used. In such cases in order to achieve good voltage distribution between the different thyristors it is necessary to connect a capacitive network in parallel with each thyristor. Thus at the moment of ignition there is a considerable amount of energy stored in this capacitive network and upon ignition this energy is for the most part transmitted to the thyristor as loss energy. Due to the above mentioned concentration of the current during the start of the ignition, the thyristor may become locally overheated and destroyed.

The simple remedy for this so far has been to operate with such low voltage levels that the capacitive energy remains at a harmless level or to introduce some current limiting element in the capacitive network, but this also causes the voltage distribution properties of the network to deteriorate.

With controlled ignition it is known that the ignition starts in the vicinity of the control device and it is therefore possible to shape the thyristor layer so that the thyristor can withstand ignition without its properties in other parts being changed.

SUMMARY OF THE INVENTION

With self-ignition, however, it is not known exactly where the ignition starts. The present invention, however, provides a method which in this case will direct the ignition to a specific area which can suitably be designed to withstand ignition, for example, it could be designed so that the ignition rapidly spreads sideways.

The invention is characterized in that a contact is applied on the defined part, which contact is electrically connected to the connection for the ignition current so that, when the blocking voltage of the defined part is exceeded, current is supplied to the connection for ignition current. The invention will be further described with the help of FIGS. 1—8.

DESCRIPTION OF THE PREFERRED EMBODIMENTS

Figure 1:
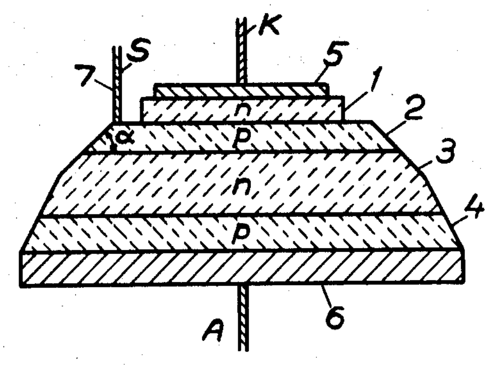
FIG. 1 shows a cross section through a thyristor of known construction, FIG. 2 the blocking characteristic for such a thyristor, FIG. 3 a cross section through a thyristor according to the invention, FIGS. 4 and 5 a further development of the thyristor according to FIG. 3, which has been designed with a special ignition thyristor, FIGS. 6 and 7 an advantageous embodiment of the thyristor according to FIGS. 4 and 5 and FIG. 8 the thyristor according to FIG. 4 connected in a circuit for controlling the current through a load.

FIG. 1 shows a section through a normal thyristor. It consists of a monocrystalline disc provided with four different layers 1, 2, 3, and 4 which are alternately P and N type. In the following it is assumed that the uppermost layer 1 is N type which means that the cathode K 5 of the thyristor is facing upwards. The cathode is in direct low-ohmic connection with the layer 1. The anode contact A 6 is connected to the layer 4 in corresponding manner. A contact S 7 is connected to the layer 2, which is the P base layer of the thyristor. So that the thyristor can withstand sufficiently great blocking voltage, the silicon element where the layer 2 reaches the outer surface is beveled so that the surface forms an angle $\alpha$ with the plane of the PN junctions, which is only a few degrees. Such a thyristor element, with suitable dimensioning of the layers, can withstand blocking voltages exceeding 2 *k* V.

Figure 2:
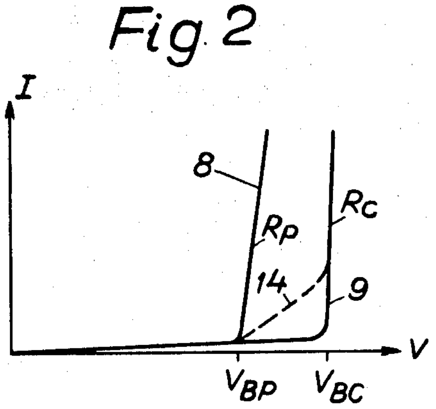

FIG. 2 shows the blocking characteristic of such a thyristor, that is the relationship between current and voltage when the cathode has negative polarity in relation to the anode, but the thyristor is still in its blocking condition. The FIG. shows two characteristic curves 8 and 9. The curve 8 is the normal blocking characteristic of the thyristor. It shows that a very small current flows as long as the voltage is less than $V_{BP}$, but that a rapid current increase is obtained with greater voltages. This current increase arises because the electrical field at the blocking PN junction between the layers 2 and 3 is so great that a current avalanche arises. However, the greatest field strength in this case occurs around the periphery of the element. This is illustrated by the curve 9 which shows the appearance of the characteristic for the central parts of the thyristor if it were possible to separate these parts from the peripheral parts. The electrical field is more evenly distributed in the center and the surge process thus only starts at a higher voltage $V_{BC}$. Notice also that the dynamic resistances $R_P$ and $R_c$ respectively for the two curves are different in magnitude. Due to the current congestion at the periphery $R_P$ is greater than $R_C$.

The difference in the avalanche voltage $V_{BP}$ and $V_{BC}$ between the peripheral and central parts of the thyristor can be exploited in order to achieve the effect sought after in the invention.

Figure 3:
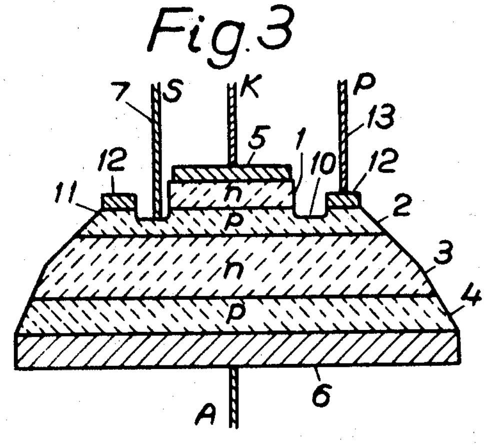

FIG. 3 shows how by making a groove 10 in the layer 2 the electrical resistance between the periphery and the center is increased. On the ridge 11 formed outside the groove 10 a ring-shaped metal layer 12 has been applied and to this is attached a contact P (13). A contact S (7) is attached to the inner edge of the groove.

If the current-voltage characteristic is measured between the anode A and the contact P in FIG. 3 the curve 8 in FIG. 2 is obtained, but between the anode A and the contact S the curve 14 is obtained. The curve 14 is characterized in that it has the same surge-knee $V_{BP}$ as the curve 8 but has a much greater dynamic resistance. If the contacts P and S are connected and a forward blocking voltage applied between the cathode K and the anode A, a positive current will thus be obtained from P towards S when the voltage exceeds the value $V_{BP}$. Since the contact P collects all, or a large part, of the peripheral current, while the contact S has small dimensions, a powerful concentration of the current is obtained to the area near the S contact. This rapidly causes the thyristor to ignite just in this area. If no special precautions are taken, however, there is a great risk that the energy stored in, for example, a capacitive network parallel-connected to the thyristor, will be transferred to the ignition area and, due to its small dimensions, lead to the destruction of the thyristor. However, by designing the first-igniting thyristor part in a suitable manner, it is possible to prevent such destruction.

Figure 4:
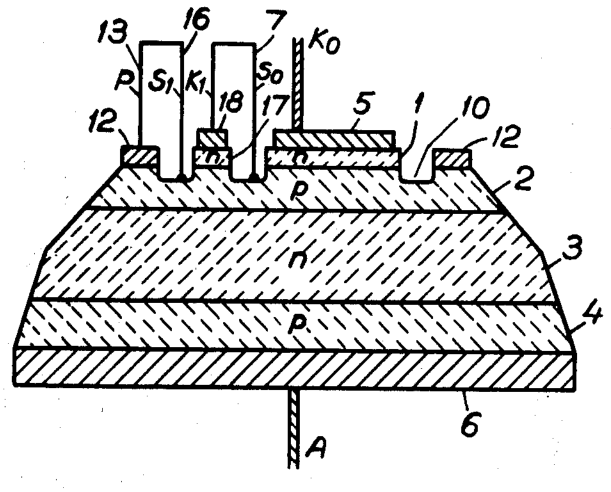

FIG. 4 shows a section through a thyristor which can withstand ignition well since it is provided in the ignition area with an auxiliary thyristor part having an N emitter layer 17 and its cathode contact $K_1$ (18) connected to the control device S0 of the main thyristor.

Figure 5:
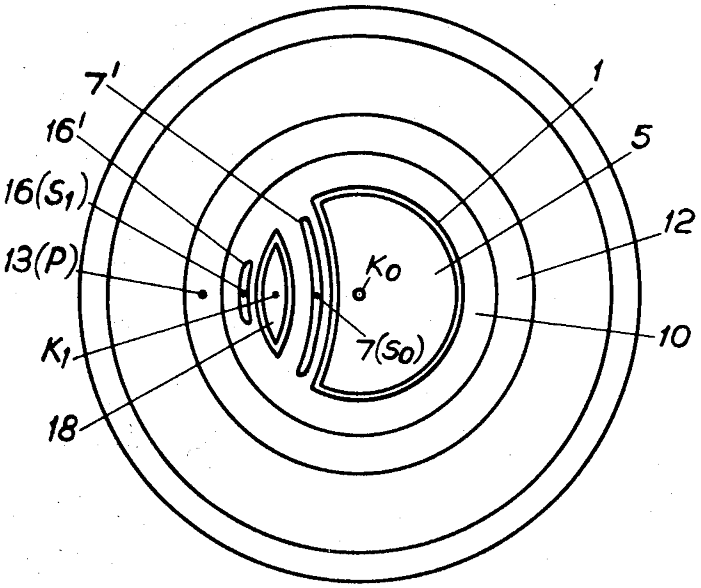

FIG. 5 shows the same thyristor seen from the cathode side. $S_o$ makes contact with the P-base layer 2 over a longer distance 7' than the gate $S_1$ (16') (auxiliary contact) of the auxiliary thyristor. When an ignition signal is applied between $S_1$ and $K_1$ the auxiliary thyristor ignites after a short delay — about 1$\mu$s. The potential at $K_1$ then approaches that of the anode and a voltage difference arises between $K_1/S_o$ and $K_o$. This means that through $S_o$ a powerful control current is fed in which in turn ignites the main thyristor along $S_o$. The ignition ignition energy from the outer circuits is thus distributed between the auxiliary thyristor and the area at $S_o$ and does not become so concentrated that the thyristor is destroyed. The energy distribution is facilitated since, due to its large dimensions and the great control current, $S_o$ is able to ignite the thyristor along a long front.

By leading the periphery current according to the invention from the contact P to an auxiliary thyristor part according to FIGS. 4 and 5, a circuit is obtained which starts the self-ignition in an area where the ignition energy may be spread to a harmless concentration. In order to limit the energy supply to the control electrode $S_1$ of the auxiliary thyristor from the contact P, an impedance element may be connected in the connection between these. The impedance element may be purely resistive or it may consist of a reactor or capacitor, possibly in series with a resistor. For the same purpose an impedance element may be connected between the cathode $K_1$ of the auxiliary thyristor and the control electrode $S_o$ of the main thyristor. It may also be advantageous to connect an impedance element between the cathodes $K_1$ and $K_o$ of the auxiliary thyristor and the main thyristor.

A control device for controlled ignition of the main thyristor through the auxiliary thyristor is suitably connected between the cathode $K_1$ of the auxiliary thyristor and its control electrode $S_1$ or between $S_1$ and $K_o$.

Figure 6:
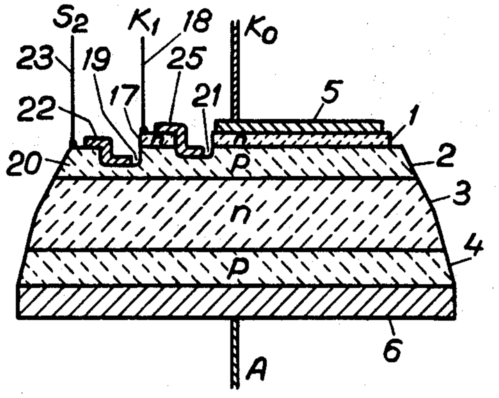
Figure 7:
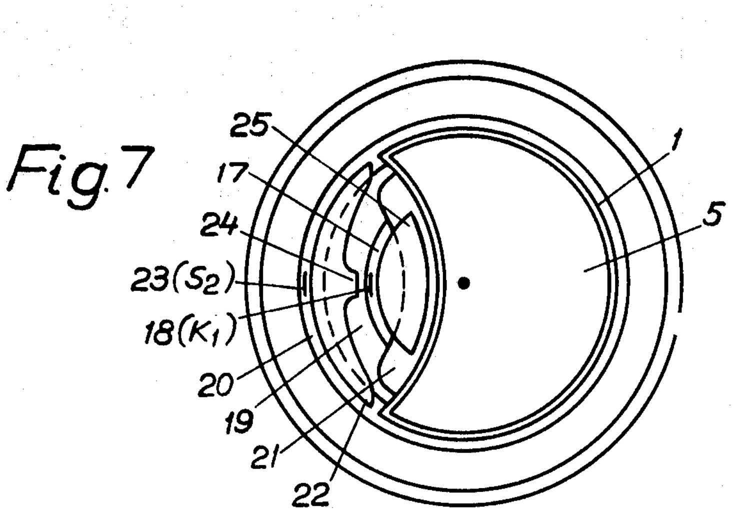

However, a peripheral contact according to FIGS. 4 and 5 running round the entire periphery takes up a large part of the cathode contact area. It is therefore desirable to decrease the length of the required peripheral contact to a minimum. FIGS. 6 and 7 show how this can be done. The groove 10 in FIG. 3 in the embodiments according to these FIGS. does not reach around the entire thyristor periphery but has limited length and corresponds to the recessed area 19. Outside this area is the ridge 20 corresponding to the ridge 11 in FIG. 3. In towards the center of the thyristor in connection with the area 19 is the cathode layer 17 of the auxiliary thyristor with its contact connection $K_1$. Inside the cathode layer 17 is the groove 21. This groove enters the P layer of the thyristor but not as deeply as the recess 19. The contact P in FIG. 3 corresponds to the contact $S_2$ (23), connected to the ridge 20, while the metal layer 22 which is in contact with the ridge 20 and reaches almost to the cathode $K_1$ corresponds to the metal layer 12 and the control electrode $S_1$ connected to it in FIG. 4. The metal layer 22 has a lip 24 projecting towards the cathode $K_1$. The width of this lip is considerably less than the length of the ridge 20. Similarly the metal layer 25 connected both to the cathode layer 17 and the groove 21 corresponds to the control device $S_o$ and the connection between $S_o$ and $K_1$ in FIG. 4.

In the same way as in FIGS. 3 and 4 the peripheral current belonging to the ridge 20 will be collected by the contact layer 22 and concentrated in the lip projecting towards the auxiliary cathode $K_2$ so that the auxiliary thyristor is ignited. When the auxiliary thyristor ignites, a powerful current will be led through the metal layer 25 and the main thyristor is ignited along its edge facing the layer 25.

The rest of the peripheral current which is not collected up in the ridge 20 and the layer 22 flows sideways through the P layer towards the cathode layer of the main thyristor. In this way it should be possible to ignite the thyristor through the usual break-over ignition mechanism. However, this current is not so concentrated as the current at the lip 24 of the layer 22. Consequently, an ignition on the remaining periphery is delayed considerably in relation to an ignition at the auxiliary thyristor. The auxiliary thyristor can thus ignite first and thus puts the break-over ignition out of action.

The current-collecting effect which the ridge 20 and the layer 22 have when the break-over voltage is exceeded during slow processes is also obtained under so-called $dV/dt$ ignition. For geometric reasons the peripheral area has a greater capacitive current than the central area. Also in this case the current concentration at the lip 24 on the layer 22 causes the thyristor ignition to start in the special area able to withstand said ignition.

The length of the ridge 20 and the layer 22 depends on the normal concentration variation in the peripheral current and that necessary for certain ignition in the specified area. In practice the projecting lip may be, for example, 1 mm wide, the ridge (20) 10 mm long and the remaining peripheral length 50 mm.

In order further to guarantee that the ignition starts in the desired area, this may be situated where the natural manufacturing tolerances have made the bevel angle $\alpha$ (FIG. 1) greatest, and thus the forward blocking ability is least.

Figure 8:
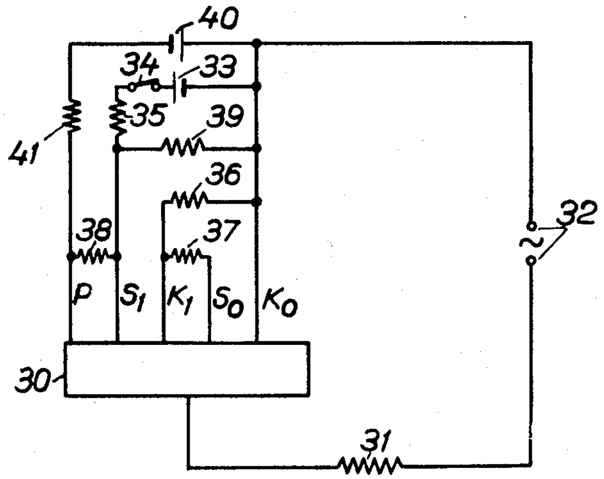

The embodiment has been described here with the connection between the control electrode of the thyristor and the ridge 20 and the connection between the cathode layer 17 of the auxiliary thyristor and the control electrode of the main thyristor being made as metal layers resting directly on the semiconductor base layer. However, the metal layers may be replaced by a number of electrodes which are, for example, welded or alloyed to the different contact areas and then connected together, for example as shown in FIG. 8. Also, in order to obtain a good balance of the energy distribution between the auxiliary thyristor and the main thyristor, another impedance may be inserted between the cathode of the auxiliary thyristor and the main cathode. Furthermore, several auxiliary thyristors may be cascade-connected, together with suitable impedance elements.

FIG. 8 shows a thyristor 30 according to FIG. 4, only the outer terminals P, $S_1$, $K_1$, $S_o$ and $K_o$ being indicated. It is connected in series with a load 31 to an alternating voltage source 32 and by variation of the phase displacement of the control pulses it is possible to control the load current. A control pulse device, symbolically indicated as a battery 33 in series with a circuit breaker 34, is in series with a resistor 35 connected between $K_o$ and $S_1$. By closing the circuit breaker during the forward blocking interval of the thyristor this can be ignited. In order to obtain a suitable magnitude of ignition current to the control electrode $S_o$ of the main thyristor the resistors 36 and 37 are connected as shown. During self-ignition the resistors 38 and 39 ensure that the current $S_1$ is suitably adjusted.

The battery 40 and the resistor 41 provide the contact P with a negative bias voltage so that the voltage is increased at which self-ignition occurs.

By making certain resistors inductive or even series or parallel connecting them with capacitors the control currents to $S_1$ and $S_0$ can be made to vary suitably as a function of the time.

It may be suitable to series connect the control device (33, 34) with a diode.

The description is based on a system where the control is carried out by the P base layer of the thyristor. However, the method can also be used when the control is carried by the N base layer. The cathode must then be replaced by an anode, N by P layers and the current and voltage directions reversed.

Finally, it should be mentioned that the method can also be used for switching elements with more than four layers, for example NPNPN or PNPNP systems.

I claim:

1. A thyristor having a body of a semiconductor material with at least four alternately P conducting and N conducting layers, the two outer layers comprising emitter layers provided with main electrodes for the load current and two inner layers comprising base layers, a connection for supplying ignition current to a first of said base layers in a major surface of the thyristor, an auxiliary contact applied to a peripheral zone of said base layer at said major surface, at least one auxiliary thyristor formed on the semiconductor body at said major surface between said auxiliary contact and said connection for supplying ignition current, one main electrode of the auxiliary thyristor being directly connected to said connection for supplying ignition current of the main thyristor, said auxiliary contact being directly connected to the auxiliary thyristor's connection for supplying ignition current, thereby turning on the auxiliary thyristor which then supplies ignition current for the main thyristor.